US012722138B2

(12) United States Patent
Wang et al.

(10) Patent No.: US 12,722,138 B2
(45) Date of Patent: Sep. 1, 2026

(54) METHOD FOR PREPARING LITHIUM EXTRACTION ABSORBENT AND ITS APPLICATION

(71) Applicant: HARBIN INSTITUTE OF TECHNOLOGY, Harbin (CN)

(72) Inventors: Wei Wang, Harbin (CN); Yu Han, Harbin (CN); Tao Zhang, Harbin (CN); Daxin Liang, Harbin (CN); Hongliang Sun, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 358 days.

(21) Appl. No.: 18/539,237

(22) Filed: Dec. 13, 2023

(65) Prior Publication Data

US 2024/0307848 A1 Sep. 19, 2024

(30) Foreign Application Priority Data

Mar. 13, 2023 (CN) ........................ 202310237086.9

(51) Int. Cl.
*B01J 20/24* (2006.01)
*B01J 20/06* (2006.01)
(Continued)

(52) U.S. Cl.
CPC ............... *B01J 20/24* (2013.01); *B01J 20/06* (2013.01); *B01J 20/28047* (2013.01);
(Continued)

(58) Field of Classification Search
None
See application file for complete search history.

(56) References Cited

U.S. PATENT DOCUMENTS 5,153,010 A 10/1992 Tashiro et al.
2011/0303611 A1* 12/2011 Terry ..................... C02F 1/285 210/683

(Continued)

FOREIGN PATENT DOCUMENTS

CN 111185139 A * 5/2020 .............. B01J 20/22
CN 111992155 A * 11/2020 .............. B01J 13/14

(Continued)

OTHER PUBLICATIONS

Pantic et al. (Ethanol-induced preparation of chitosan aerogels for bone tissue engineering, available online Aug. 22, 2022), pp. 1-20)/ (Year: 2022).*

(Continued)

*Primary Examiner* — Clare M Perrin
(74) *Attorney, Agent, or Firm* — PORUS IP LLC

(57) ABSTRACT

A method for preparing a lithium extraction adsorbent and an application of the lithium extraction adsorbent are provided. The method includes: (i) forming a homogeneous casting liquid by stirring a metal-based lithium ion sieve, an organic carrier, and a functional material; (ii) adding the homogeneous casting liquid dropwise to a solidifying liquid to obtain gel particles, wherein the solidifying liquid consists of sodium hydroxide and ethanol; and (iii) washing the gel particles to neutrality with deionized water to obtain washed gel particles, followed by placing the washed gel particles in a glutaraldehyde solution for stirring to crosslink for 0.5 h to 12 h to obtain crosslinked gel particles, freeze-drying the crosslinked gel particles to obtain the lithium extraction adsorbent, wherein a usage condition of the lithium extraction adsorbent includes: before use, activating the lithium extraction adsorbent by placing the lithium extraction adsorbent into an alkali activator for stirring for (Continued)

0.5 h to 12 h, and washing the lithium extraction adsorbent to neutrality with deionized water.

13 Claims, 12 Drawing Sheets

(51) Int. Cl.
*B01J 20/28* (2006.01)
*B01J 20/30* (2006.01)
*C02F 1/28* (2023.01)
*C02F 101/10* (2006.01)

(52) U.S. Cl.
CPC ....... *B01J 20/3071* (2013.01); *B01J 20/3085* (2013.01); *C02F 1/288* (2013.01); *C02F 1/281* (2013.01); *C02F 1/285* (2013.01); *C02F 2101/10* (2013.01)

(56) References Cited

U.S. PATENT DOCUMENTS

2014/0127125 A1* 5/2014 Chung .................. C01D 15/02
423/599
2014/0210122 A1* 7/2014 Chung ................ B01J 20/3007
264/42

FOREIGN PATENT DOCUMENTS

CN 114130375 A 3/2022
CN 111992155 B 8/2022

OTHER PUBLICATIONS

Machine translation of CN-111185139-A (provided by Applicant). (Year: 2020).*
MAchine translation of CN-111992155-A (provided by Applicant). (Year: 2022).*

* cited by examiner

METHOD FOR PREPARING LITHIUM EXTRACTION ABSORBENT AND ITS APPLICATION

CROSS-REFERENCE TO RELATED APPLICATIONS

This application claims priority to Chinese Patent Application No. 202310237086.9, filed on Mar. 13, 2023, the contents of which are hereby incorporated by reference to its entirety.

TECHNICAL FIELD

The present disclosure relates to the technical field of preparing lithium extraction material by adsorption procedure, and in particular, to a method for preparing a lithium extraction adsorbent and its application.

BACKGROUND

Lithium, known as white petroleum, is widely applied in the industrial field. In the face of a rapidly growing demand in the market, it is difficult to maintain a balance between supply and demand with the current proven lithium ore reserves and lithium resource development. It is an effective way for extracting lithium from salt lakes or seawater to alleviate the shortage of lithium resources. As a lithium extraction procedure that has been widely studied, the adsorption has the advantages of simple operation, low cost and good selectivity.

Currently, a metal-based adsorbent, as the most studied lithium adsorbent, is widely applied in adsorption process because of its good selectivity of lithium ion and a high adsorption capacity. However, the adsorption capacity and ion selectivity of the lithium adsorbent currently used are greatly affected by the pH value of the water body. The lithium adsorbent usually has the high adsorption capacity and ion selectivity in a strongly alkaline environment. Water body in natural environment (e.g., saline lake water and seawater) typically have a pH of 6-9, which could not be adjusted by adding alkali because the water body contains a large number of elements that are prone to precipitation. Therefore, the lithium adsorbent often only has 15% of the theoretical adsorption capacity under natural conditions, which limits the application of the lithium adsorbent in natural water body.

For example, Chinese patent application CN 111185139 A discloses a preparation method of a hydrophilic spherical composite lithium ion sieve adsorbent. The preparation method includes mixing the lithium ion sieve and chitosan homogeneously to obtain a composite hydrogel; dropping the composite hydrogel into an alkali solution to form gel pellets, and then crosslinking the gel pellets, and then washing and drying the gel pellets to obtain the hydrophilic spherical composite lithium ion sieve adsorbent. For example, Chinese patent application CN 114130375 A also discloses a preparation method of a membranous lithium ion sieve adsorbent, which prepares a stable adsorbent through a series of steps. These adsorbents do not have the function of microenvironment regulation, which makes the adsorption capacity of the adsorbents under natural condition much lower than that under strongly alkaline condition. These adsorbents are poorly suited for use in natural water due to effect of the pH. Therefore, it is necessary to provide a lithium extraction adsorbent with the function of microenvironmental regulation, so that the adsorption capacity under natural condition may be comparable to that under alkaline condition, to optimize the adsorption effect of the adsorbent in natural environment.

SUMMARY

One or more embodiments of the present disclosure provide a method for preparing a lithium extraction adsorbent. The method includes the following steps: (i) forming a homogeneous casting liquid by stirring a metal-based lithium ion sieve, an organic carrier, and a functional material; (ii) adding the homogeneous casting liquid dropwise to a solidifying liquid to obtain gel particles, wherein the solidifying liquid consists of sodium hydroxide and ethanol; and (iii) washing the gel particles to neutrality with deionized water to obtain washed gel particles, followed by placing the washed gel particles in a glutaraldehyde solution for stirring to crosslink for 0.5 h to 12 h to obtain crosslinked gel particles, freeze-drying the crosslinked gel particles to obtain the lithium extraction adsorbent, wherein a usage condition of the lithium extraction adsorbent includes: before use, activating the lithium extraction adsorbent by placing the lithium extraction adsorbent into an alkali activator for stirring for 0.5 h to 12 h, and washing the lithium extraction adsorbent to neutrality with deionized water.

In some embodiments, the metal-based lithium ion sieve is manganese-based lithium ion sieve (HMO).

In some embodiments, the functional material corresponds to a quaternized derivative corresponding to the organic carrier.

In some embodiments, a mass ratio of the metal-based lithium ion sieve, the functional material, and the organic carrier is 1.125:1.25:1.

In some embodiments, the metal-based lithium ion sieve is prepared by a process including: (a) weighing lithium salt and metal precursor in a molar ratio of lithium to manganese of 1:2 to 2:1, mixing the lithium salt and the metal precursor in a ball mill for 2 h to obtain a mixed powder; (b) calcining the mixed powder in a tube furnace at 300° C. to 500° C. under an air atmosphere for 4 h to 8 h to obtain a lithium ion sieve precursor; and (c) placing the lithium ion sieve precursor in a hydrochloric acid solution with 0.5 M for pickling at room temperature for 12 h to 24 h to obtain a pickled lithium ion sieve precursor and drying the pickled lithium ion sieve precursor at 35° C. to 100° C. for 8 h to 24 h to obtain the metal-based lithium-ion sieve.

In some embodiments, the lithium salt is one or more of lithium chloride, lithium carbonate, lithium hydroxide, or hydrates thereof.

In some embodiments, the metal precursor is one of manganese carbonate, manganese acetate, or manganese nitrate.

In some embodiments, a concentration of the glutaraldehyde solution is in a range of 0.01 M to 0.2 M, and a time of crosslinking is 3.5 h.

In some embodiments, the alkali activator is one or more of sodium hydroxide, barium hydroxide, potassium hydroxide, or ammonia, a concentration of the alkali activator is in a range of 0.001 M to 1 M, and the alkali activation time is 0.5 h to 12 h.

One or more embodiments of the present disclosure also provide an application of the lithium extraction adsorbent prepared by the aforementioned method for extracting lithium from various types of water bodies.

BRIEF DESCRIPTION OF THE DRAWINGS

The present disclosure is further illustrated by way of exemplary embodiments, which is described in detail in the accompanying figures. These embodiments are not limiting, and in these embodiments, the same numbering denotes the same structure, wherein.

DETAILED DESCRIPTION

Figure 1:
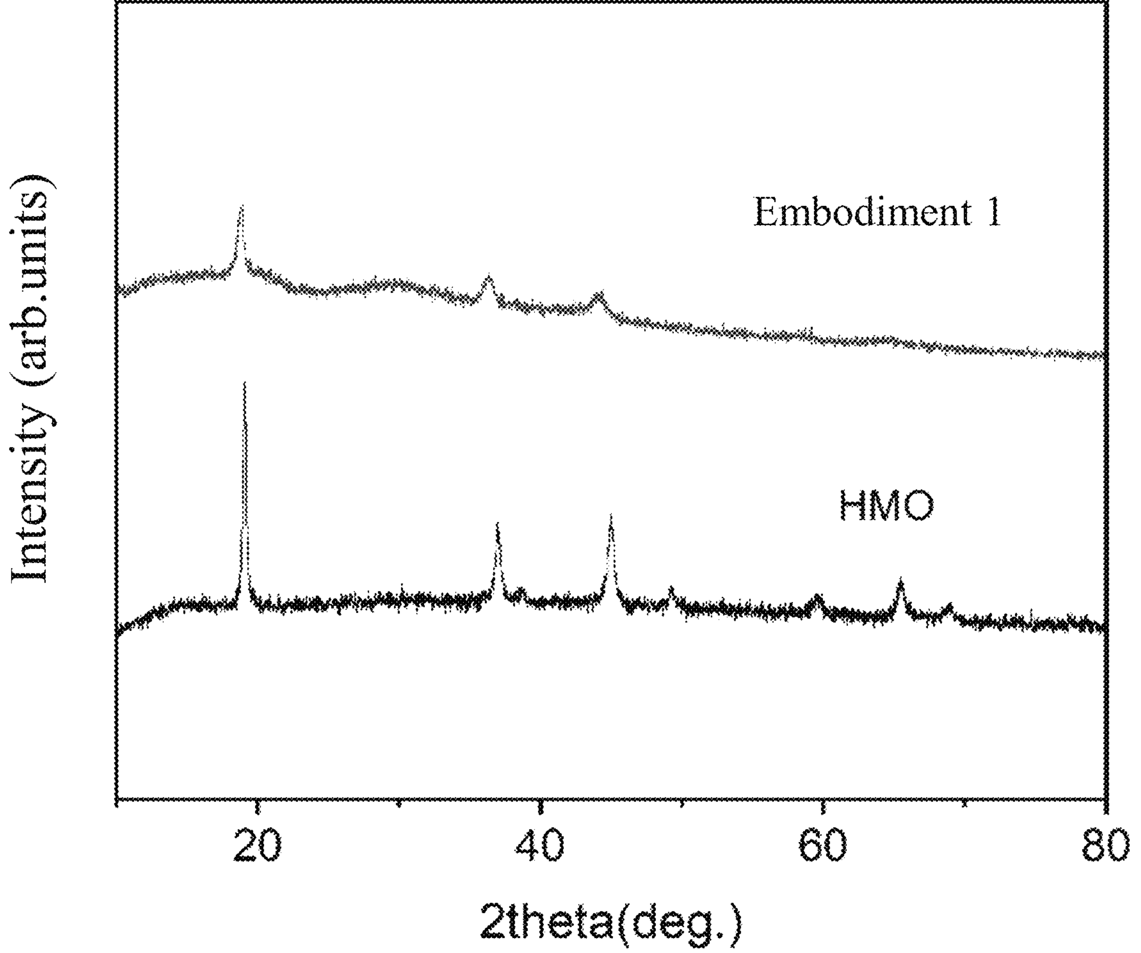
FIG. 1 is X-Ray Diffraction (XRD) patterns of a commercial HMO and a lithium extraction adsorbent prepared according to Embodiment 1 of the present disclosure.

In order to more clearly illustrate the technical solution of the embodiments of the present disclosure, the accompanying drawings required for the description of the embodiments are briefly introduced below. Obviously, the accompanying drawings in the following description are only some examples or embodiments of the present disclosure, and a person of ordinary skill in the art can also apply the present disclosure to other similar scenarios without creative labor based on these drawings. The present disclosure can be applied to other similar scenarios without creative labor based on these drawings.

As shown in the present disclosure and the claims, unless the context clearly suggests otherwise, the words "one," "a," "an," and/or "the" do not specifically refer to the singular, but may also include the plural. Generally, the terms "including" and "comprising" suggest only the inclusion of clearly identified steps and elements. In general, the terms "including" and "comprising" suggest the inclusion of explicitly identified steps and elements that do not constitute an exclusive list, and the method or apparatus may also include other steps or elements.

Some embodiments of the present disclosure provide a method for preparing a lithium extraction adsorbent. The method includes steps i-iii as described below.

As used herein, the term "lithium extraction adsorbent" refers to a material capable of retaining lithium in its structure by adsorption (e.g., chemisorption or physisorption) and/or by exchanging lithium ion with other ion in its structure.

In step i, a homogeneous casting liquid is formed by stirring a metal-based lithium ion sieve, an organic carrier, and a functional material.

The term "organic carrier" refers to a medium in which inorganic components and/or inorganic components are stably dispersed. Exemplarily, the organic carrier may include natural material and synthetic polymeric materials. For example, the natural material may include chitosan, agar, cellulose, and derivatives thereof (e.g., carboxymethyl cellulose, etc.); and the synthetic polymeric materials may include polyvinyl alcohol (PVA), polyurethane, polyacrylamide (PAM), etc.

In some embodiments, the organic carrier may include one or more of chitosan, PVA, PAM, carboxymethyl cellulose. In some embodiments, the organic carrier may be chitosan. In some embodiments, the organic carrier may include chitosan, and further include one or more of PVA, PAM, and carboxymethyl cellulose.

The term "functional material" refers to a material that imparts physical and/or chemical properties to the lithium extraction adsorbent.

In some embodiments, the functional material may be a quaternized derivative of the organic carrier. In some preferred embodiments, the functional material may be quaternized chitosan.

In some embodiments, a dopant amount of the functional material may be from 0.01% to 175%. The dopant amount refers to a ratio of a content of the functional material to a content of the organic carrier. For example, the dopant amount of the functional material may be about 0.01%, 1%, 10%, 15%, 20%, 25%, 30%, 35%, 40%, 45%, 50%, 60%, 70%, 80%, 90%, 100%, 110%, 120%, 130%, 140%, 150%, 160%, 170%, or 175%. In some preferred embodiments, the dopant amount of the functional material is from 100% to 150%. In some preferred embodiments, the dopant amount of the functional material is about 125%.

The term "lithium ion sieve" refers to a compound that selectively adsorbs lithium. Exemplary, a metal-based lithium ion sieve may include a manganese-based lithium ion sieve (HMO), a titanium-based lithium ion sieve (HTO). For example, the HMO may include $\lambda$-$MnO_2$, $MnO_2$-$0.3H_2O$, and $MnO_2$-$0.5H_2O$, etc, and the HTO may include $H_2TiO_3$, $H_4Ti_5O_{12}$, etc.

In some embodiments, the metal-based lithium ion sieve may be HMO or HTO.

In some embodiments, a loading amount of the metal-based lithium ion sieve may be from 10% to 100%. The loading amount is a ratio of a content of the metal-based lithium ion sieve to a sum of the contents of the organic carrier and the functional material. For example, the loading amount of the metal-based lithium ion sieve may be about 10%, 15%, 20%, 25%, 30%, 35%, 40%, 45%, 50%, 55%, 60%, 65%, 70%, 75%, 80%, 85%, 90%, 95%, or 100%. In some preferred embodiments, the loading amount of the metal-based lithium ion sieve may be from 30% to 70%. In some preferred embodiments, the loading amount of the metal-based lithium ion sieve may be about 50%.

In some embodiments, a mass ratio of the metal-based lithium ion sieve, the functional material, and the organic carrier in the step i is 1.125:1.25:1.

In some embodiments, the metal-based lithium ion sieve may be prepared by a process including steps a-c as described below.

In step a, a lithium salt and a metal precursor are weighed in a predetermined molar ratio of lithium to the metal-based counterpart and mixed to obtain a mixed powder.

In some embodiments, the lithium salt may include one or more of lithium chloride, lithium carbonate, lithium hydroxide, and hydrates thereof. In some preferred embodiments, the lithium salt may be lithium carbonate.

The term "metal precursor" refers to a starting material used in the preparation of the metal-based lithium ion sieve.

In some embodiments, the metal-based lithium ion sieve may be HMO, and the metal precursor may be one of manganese carbonate, manganese acetate, or manganese nitrate. In some preferred embodiments, the metal precursor may be manganese carbonate.

Correspondingly, in some embodiments, the molar ratio of lithium to manganese in the lithium salt and the metal precursor is from 1:2 to 2:1. For example, the molar ratio of lithium to manganese may be approximately 1:2, 1:1.8, 1:1.6, 1:1.4, 1:1.2, 1:1, 1.2:1, 1.4:1, 1.6:1, 1.8:1, or 2:1. In some preferred embodiments, the molar ratio of lithium to manganese in the lithium salt and the metal precursor is from 1.33:1.67.

In some embodiments, the metal-based lithium ion sieve may be HTO, and the metal precursor may be an anatase titanium dioxide. Correspondingly, in some embodiments, the molar ratio of lithium to titanium in the lithium salt and the metal precursor may be from 1:2 to 2:1. For example, the molar ratio of lithium to titanium may be approximately 1:2, 1:1.8, 1:1.6, 1:1.4, 1:1.2, 1:1, 1.2:1, 1.4:1, 1.6:1, 1.8:1, or 2:1. In some preferred embodiments, the molar ratio of lithium to titanium in the lithium salt and the metal precursor may be 2:1.

In some embodiments, mixing may be performed in a ball mill.

In some embodiments, a mixing time is from 1 h to 3 h. For example, the mixing time may be about 1 h, 1.5 h, 2 h, 2.5 h, or 3 h. In some embodiments, the mixing time may be 2 h.

In step b, the mixed powder is calcined under an air atmosphere to obtain a lithium ion sieve precursor (i.e., the calcined material).

In some embodiments, a calcination temperature may be from 300° C. to 700° C. For example, the calcination temperature may be about 300° C., 350° C., 400° C., 450° C., 500° C., 550° C., 600° C., 650° C., or 700° C. In some embodiments, the calcination temperature suitable for preparing the HMO may be preferably from 300° C. to 500° C., for example, 300° C., 320° C., 340° C., 360° C., 380° C., 400° C., 420° C., 440° C., 460° C., 480° C., or 500° C. In some embodiments, the calcination temperature suitable for preparing the HTO may be preferably from 500° C. to 700° C., for example, 500° C., 520° C., 540° C., 560° C., 580° C., 600° C., 620° C., 640° C., 660° C., 680° C., or 700° C.

In some embodiments, the calcination may be performed in a tube furnace.

In some embodiments, the calcination time may be from 4 h to 8 h. For example, the calcination time may be about 4 h, 4.5 h, 5 h, 5.5 h, 6 h, 6.5 h, 7 h, 7.5 h, or 8 h. In some preferred embodiments, the calcination time may be 4 h.

In step c, the lithium ion sieve precursor is placed into a hydrochloric acid solution and pickled at room temperature, and dried, to obtain the metal-based lithium ion sieve.

In some embodiments, a concentration of the hydrochloric acid solution may be from 0.3 M to 0.5 M. For example, the concentration of the hydrochloric acid solution may be about 0.3 M, 0.32 M, 0.34 M, 0.36 M, 0.38 M, 0.4 M, 0.42 M, 0.44 M, 0.46 M, 0.48 M, or 0.5 M. In some preferred embodiments, the concentration of the hydrochloric acid solution may be 0.3 M. In some preferred embodiments, the concentration of the hydrochloric acid solution may be 0.5 M.

In some embodiments, a pickling time may be from 12 h to 24 h. For example, the pickling time may be about 12 h, 13 h, 14 h, 15 h, 16 h, 17 h, 18 h, 19 h, 20 h, 21 h, 22 h, 23 h, or 24 h. In some preferred embodiments, the pickling time may be from 18 h to 24 h. In some preferred embodiments, the pickling may be about 24 h.

In some embodiments, a drying temperature may be from 35° C. to 100° C. For example, the drying temperature may be about 35° C., 40° C., 45° C., 50° C., 55° C., 60° C., 65° C., 70° C., 75° C., 80° C., 85° C., 90° C., 95° C., or 100° C. In some preferred embodiments, the drying temperature may be from 60° C. to 100° C.

In some embodiments, a drying time may be from 8 h to 24 h. For example, the drying time may be about 8 h, 9 h, 10 h, 11 h, 12 h, 13 h, 14 h, 15 h, 16 h, 17 h, 18 h, 19 h, 20 h, 21 h, 22 h, 23 h, or 24 h. In some preferred embodiments, the drying time may be from 8 h to 10 h.

In step ii, the casting liquid is added dropwise to the solidifying liquid to obtain the gel particles, wherein the solidifying liquid consists of sodium hydroxide and ethanol.

In step iii, the gel particles are washed to neutrality with deionized water to obtain washed gel particles, the washed gel particles are placed in a glutaraldehyde solution for stirring to crosslink to obtain crosslinked gel particles, and the crosslinked gel particles are freeze-dried to obtain the lithium extraction adsorbent.

In some embodiments, a concentration of the glutaraldehyde solution may be from 0.01 M to 0.2 M. For example, the concentration of the glutaraldehyde solution may be about 0.01 M, 0.02 M, 0.04 M, 0.06 M, 0.08 M, 0.1 M, 0.12 M, 0.14 M, 0.16 M, 0.18 M, or 0.2 M. In some preferred embodiments, the concentration of the glutaraldehyde solution may be from 0.1 M to 0.2 M. In some preferred embodiments, the concentration of the glutaraldehyde solution may be about 0.15 M.

In some embodiments, a crosslinking time may be from 2 h to 6 h. For example, the crosslinking time may be about 2 h, 2.5 h, 3 h, 3.5 h, 4 h, 4.5 h, 5 h, or 6 h. In some preferred embodiments, the crosslinking time may be about 3.5 h.

In some embodiments, a usage condition of the lithium extraction adsorbent may include: before use, activating the lithium extraction adsorbent by placing the lithium extraction adsorbent in the alkali activator for stirring for 0.5 h to 12 h, and washing the lithium extraction adsorbent to neutrality with deionized water.

In some embodiments, the alkali activator may include one or more of sodium hydroxide, barium hydroxide, potassium hydroxide, and ammonia. In some preferred embodiments, the alkali activator may be sodium hydroxide.

In some embodiments, a concentration of the alkali activator may be from 0.001 M to 1 M. For example, the concentration of the alkali activator may be about 0.01 M, 0.05 M, 0.1 M, 0.2 M, 0.3 M, 0.4 M, 0.5 M, 0.6 M, 0.7 M, 0.8 M, 0.9 M, or 1 M. In some preferred embodiments, the concentration of the alkali activator may be from 0.001 M to 0.5 M. In some preferred embodiments, the concentration of the alkali activator may be about 0.01 M.

In some embodiments, an alkali activation time may be from 0.5 h to 12 h. For example, the alkali activation time may be 0.5 h, 1 h, 2 h, 3 h, 4 h, 5 h, 6 h, 7 h, 8 h, 9 h, 10 h, 11 h, or 12 h. In some preferred embodiments, the alkali activation time is from 0.5 h to 6 h. In some preferred embodiments, the alkali activation time may be about 1 h.

Some embodiments of the present disclosure also provide an application for extracting lithium in various types of water bodies using the lithium extraction adsorbent prepared as described above.

The method for preparing the lithium extraction adsorbent in some embodiments of the present disclosure prepares a porous organic polymer composite adsorbent loading the metal-based adsorption material by mixing the organic carrier, the functional material, and the metal-based lithium ion sieve in a certain ratio, solidification, and freeze-drying. The composite adsorbent has a good pore structure due to freeze-drying to achieve uniform loading of the metal-based adsorption material. The method of some embodiments of the present disclosure has the advantages of low energy consumption, simple operation, no special equipment, and good reproducibility, which may have a good application prospect.

In particular, for lithium-containing aqueous body under a weak alkaline condition, lithium is extracted by direct addition of alkali, causing a large amount of excess precipitation, thereby increasing an amount of reagent required for extracting lithium. In addition, the adsorption capacity and adsorption selectivity of the metal-based adsorbent may be significantly inhibited under such weakly alkaline condition. The above-described composite adsorbent material, by solidification and freeze-drying, takes a water-soluble polymer material as a matrix, and uses the corresponding quaternized derivative of the water-soluble polymer material as the main functional group for microenvironmental regulation, and loads the metal-based adsorbent on the surface of the matrix. The composite adsorbent material may activate the metal-based adsorbent to form an alkaline microenvironment through alkali activation so as to improve the selective extraction effect on lithium by the metal-based adsorbent under weak alkaline condition. The composite adsorbent material may improve the adsorption capacity and adsorption selectivity of the metal-based adsorbent under natural condition without raising the pH of the water body, a saturated adsorption capacity of which on lithium ion may reach 18 mg/g.

The experimental procedure used in the following embodiments was conventional if not otherwise stated. The experimental materials used in the following embodiments were, if not otherwise specified, obtained through purchase from a conventional biochemical reagent company. The quantitative tests in the following embodiments were set up with three repeated experiments, and the results were averaged.

Embodiment 1

1.0 g of chitosan and 1.25 g of quaternized chitosan were dissolved in a solution of 0.5 mL of acetic acid and 50 mL of water and placed on a magnetic stirrer for stirring for 6 h. After mixing evenly, 1.125 g of HMO was added to the above mixed solution and stirring was continued for 6 h to form a homogeneous casting liquid. Gel particles were obtained by adding the homogeneous casting liquid dropwise to a solidifying liquid through a syringe. The solidifying liquid was prepared by mixing 150 mL of 3M sodium hydroxide and 50% ethanol. The gel particles were washed to neutrality with deionized water to obtain washed gel particles, and then the washed gel particles were placed in a glutaraldehyde solution for stirring to crosslink and subjected to freeze-drying to obtain a well-defined pore structure. A concentration of the glutaraldehyde solution was 0.1 M, a volume of the glutaraldehyde solution was 100 mL, and a stirring time for crosslinking was 3.5 h. Finally, an efficient lithium extraction adsorbent was obtained. Before use, the lithium extraction adsorbent was activated by placing the lithium extraction adsorbent in the 0.001 M sodium hydroxide solution for stirring for 1 h, and then washed to neutrality with deionized water. The activated lithium extraction adsorbent had the function of accelerating hydrogen ion migration coupled with in-situ conversion.

FIG. 1 is XRD patterns of a commercial HMO and a lithium extraction adsorbent prepared according to Embodiment 1 of the present disclosure. It can be seen that the HMO has been successfully loaded onto the carrier material in the lithium extraction adsorbent of this embodiment. Moreover, the XRD characteristic peaks of the lithium extraction adsorbent in this embodiment remain unchanged compared to those of the HMO, indicating that the preparation process does not change the structure of the HMO.

Figure 2:
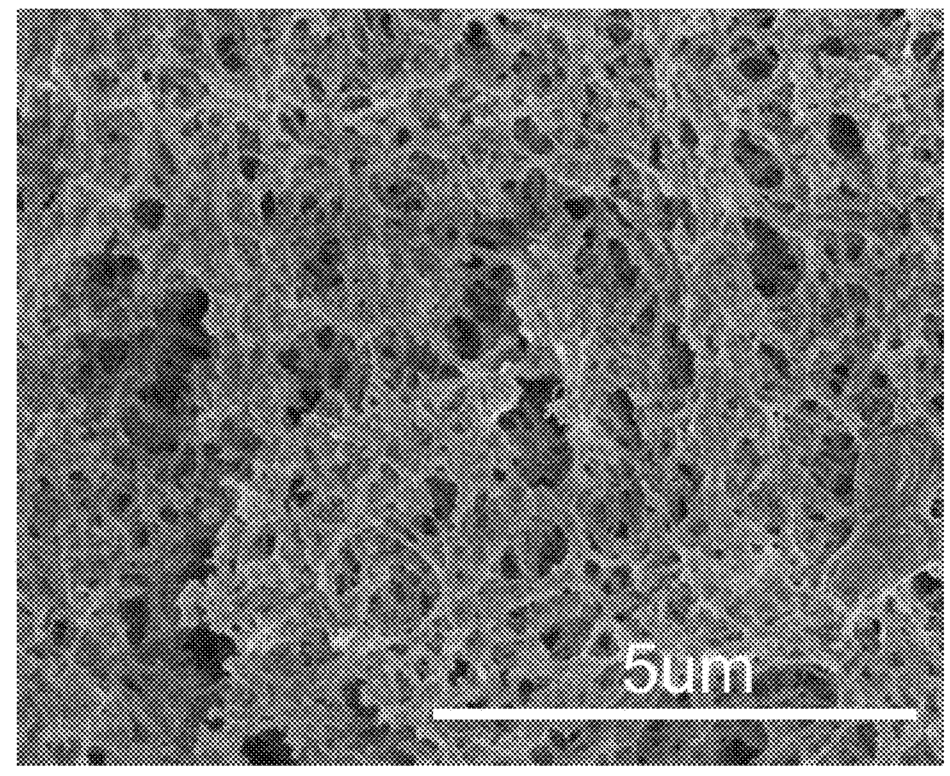
FIG. 2 is a scanning electron microscopy (SEM) image of the lithium extraction adsorbent prepared according to Embodiment 1 of the present disclosure.

FIG. 2 is a SEM image of a lithium extraction adsorbent prepared according to Embodiment 1 of the present disclosure. It can be seen that the lithium extraction adsorbent has an interconnected pore structure and a metal-based adsorbent is uniformly dispersed inside the carrier through freeze-drying.

Figure 3:
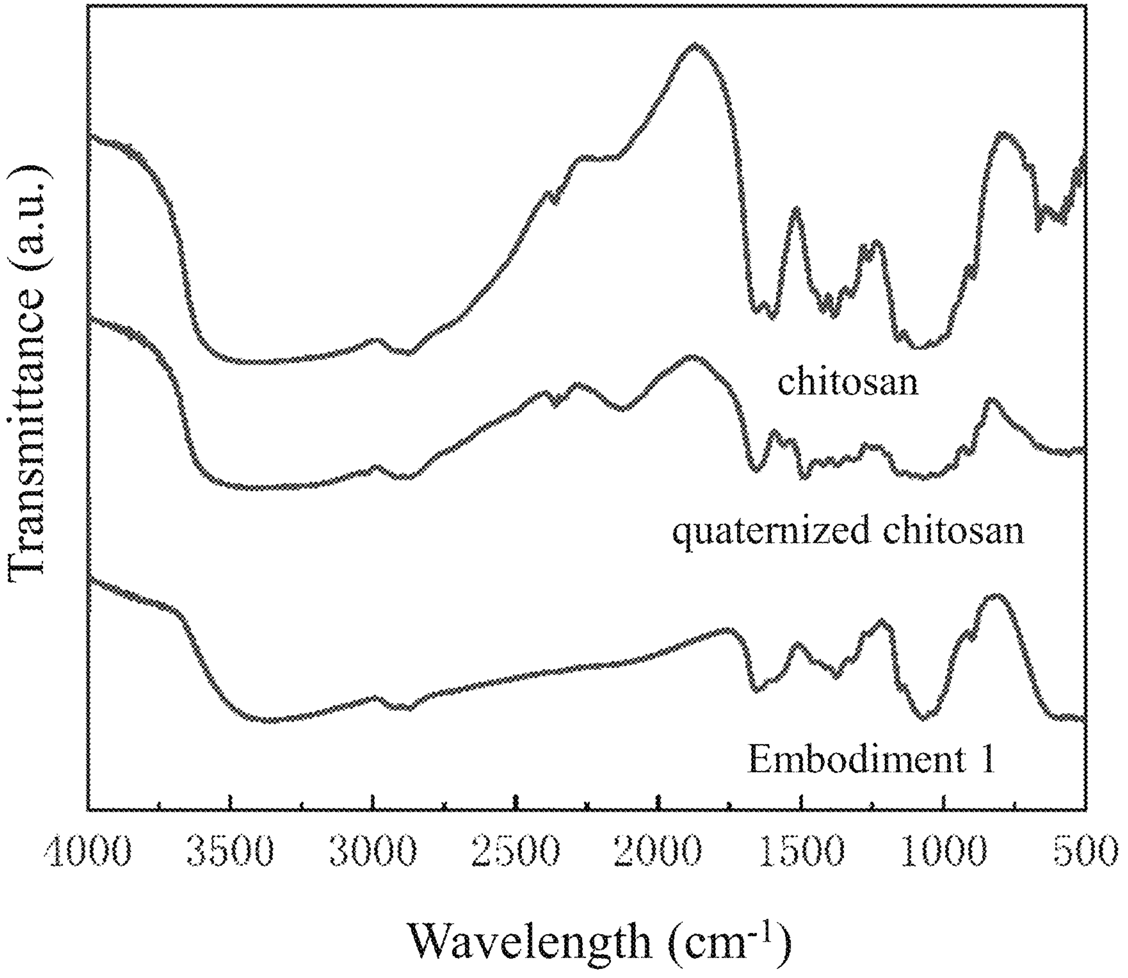
FIG. 3 is Fourier Transform-Infrared (FTIR) spectra of chitosan, quaternized chitosan, and the lithium extraction adsorbent prepared according to Embodiment 1 of the present disclosure.

FIG. 3 is FTIR spectra of chitosan, quaternized chitosan, and a lithium extraction adsorbent prepared according to Embodiment 1 of the present disclosure. It can be seen that the lithium extraction adsorbent has characteristic functional groups of chitosan and quaternized chitosan.

Embodiment 2

1.0 g of chitosan and 1.25 g of quaternized chitosan were dissolved in a solution of 0.5 mL of acetic acid and 50 mL of water and placed on a magnetic stirrer for stirring for 6 h. After mixing evenly, 1.125 g of HMO was added to the above mixed solution and stirring was continued for 6 h to form the homogeneous casting liquid. The gel particles were obtained by adding the homogeneous casting liquid dropwise to the solidifying liquid through a syringe. The solidifying liquid was prepared by mixing 150 mL of 3M sodium hydroxide and 50% ethanol. The gel particles were washed to neutrality with deionized water to obtain washed gel particles, and then the washed gel particles were placed in the glutaraldehyde solution for stirring to crosslink and subjected to freeze-drying to obtain a well-defined pore structure. The concentration of the glutaraldehyde solution was 0.1 M, the volume of the glutaraldehyde solution was 100 mL, and the stirring time for crosslinking was 3.5 h.

Finally, the efficient lithium extraction adsorbent was obtained, which had the function of accelerating the migration of hydrogen ions.

Embodiment 3

1.0 g of chitosan, 1.0 g of PVA, and 1.25 g of quaternized chitosan were dissolved in a solution of 0.5 mL acetic acid and 50 mL water and placed on a magnetic stirrer for stirring for 6 h. After mixing evenly, 1.125 g of HMO was added into the above mixed solution and stirring was continued for 6 h to form the homogeneous casting liquid. The gel particles were obtained by adding the homogeneous casting liquid dropwise to the solidifying liquid through a syringe. The solidifying liquid was prepared by mixing 150 mL of 3M sodium hydroxide and 50% ethanol. The gel particles were washed to neutrality with deionized water to obtain washed gel particles, and then the washed gel particles were placed in the glutaraldehyde solution for stirring to crosslink and subjected to freeze-drying to obtain a well-defined pore structure. The concentration of the glutaraldehyde solution was 0.1 M, the volume of the glutaraldehyde solution was 100 mL, and the stirring time for crosslinking was 3.5 h. Finally, the efficient lithium extraction adsorbent was obtained. Before use, the lithium extraction adsorbent was activated by placing the lithium extraction adsorbent in 0.001 M sodium hydroxide solution for stirring for 1 h, and then washed to neutrality with deionized water. The activated lithium extraction adsorbent had microenvironmental regulation function.

Embodiment 4

1.0 g of chitosan and 1.25 g of quaternized chitosan were dissolved in a solution of 0.5 mL of acetic acid and 50 mL of water and placed on a magnetic stirrer for stirring for 6 h. After mixing evenly, 1.125 g of HTO was added into the above mixed solution and stirring was continued for 6 h to form the homogeneous casting liquid. The gel particles were obtained by adding the homogeneous casting liquid dropwise to the solidifying liquid through a syringe. The solidifying liquid was prepared by mixing 150 mL of 3 M sodium hydroxide and 50% ethanol. The gel particles were washed to neutrality with deionized water to obtain washed gel particles and then the washed gel particles were placed in the glutaraldehyde solution for stirring to crosslink and subjected to freeze-drying to obtain a well-defined pore structure. The concentration of the glutaraldehyde solution was 0.1 M, the volume of the glutaraldehyde solution was 100 mL, and the stirring time for crosslinking was 3.5 h. Finally, the efficient lithium extraction adsorbent was obtained. Before use, the lithium extraction adsorbent was activated by placing the lithium extraction adsorbent in 0.001 M sodium hydroxide solution for stirring for 1 h, and then washed to neutrality with deionized water. The activated lithium extraction adsorbent had microenvironmental regulation function.

Embodiment 5

1.0 g of chitosan and a series of quaternized chitosan with different weight were dissolved in a solution of 0.5 mL acetic acid and 50 mL water and placed on a magnetic stirrer for stirring for 6 h. The series of quaternized chitosan had different weight of 0 g, 0.25 g, 0.75 g, 1.25 g, and 1.75 g. After mixing evenly, 1.125 g of HMO was added into the above mixed solution and stirring was continued for 6 h to obtain the homogeneous casting liquid. The gel particles were obtained by adding the casting liquid dropwise to the solidifying liquid through a syringe. The solidifying liquid was prepared by mixing 150 mL of 3M sodium hydroxide solution and 50% ethanol. The gel particles were washed to neutrality with deionized water to obtain washed gel particles, and then the washed gel particles were placed in the glutaraldehyde solution for stirring to crosslink and subjected to freeze-drying to obtain a well-defined pore structure. The concentration of the glutaraldehyde solution was 0.1 M, the volume of the glutaraldehyde solution was 100 mL, and the stirring time for crosslinking was 3.5 h. Finally, the efficient lithium extraction adsorbent was obtained. Before use, the lithium extraction adsorbent was activated by placing the lithium extraction adsorbent in 0.001 M sodium hydroxide solution for stirring for 1 h, and then washed to neutrality with deionized water. The activated lithium extraction adsorbent had microenvironmental regulation function.

Embodiment 6

1.0 g of chitosan and 1.25 g of quaternized chitosan were dissolved in a solution of 0.5 mL of acetic acid and 50 mL of water and placed on a magnetic stirrer for stirring for 6 h. After mixing evenly, a series of HMO with different weight were added to the above mixed solution and stirring was continued for 6 h to form the homogeneous casting liquid. The series of HMO had different weight of 0.28125 g, 0.5625 g, 1.125 g, 1.6875 g, and 2.25 g. The gel particles were obtained by adding the casting liquid dropwise to the solidifying liquid through a syringe. The solidifying liquid was prepared by mixing 150 mL of 3M sodium hydroxide and 50% ethanol. The gel particles were washed to neutrality with deionized water to obtain washed gel particles, and then the washed gel particles were placed in the glutaraldehyde solution for stirring to crosslink and subject to freeze-drying to obtain a well-developed pore structure. The concentration of the glutaraldehyde solution was 0.1 M, the volume of the glutaraldehyde solution 100 mL, and the stirring time for crosslinking was 3.5 h. Finally, the efficient lithium extraction adsorbent was obtained. Before use, the lithium extraction adsorbent was activated by placing the lithium extraction adsorbent in 0.001 M sodium hydroxide solution for stirring for 1 h, and then washed to neutrality with deionized water. The activated lithium extraction adsorbent had microenvironmental regulation function.

Embodiment 7

Commercial HMO, as an active component (also referred to as an adsorbent material), was added into 7% sodium chloride solution with an initial lithium ion concentration of 25 mg/L. The dosage of the active component in the above solution was 0.5 g/L. The pH of the above solution was adjusted to a range of 6~11 by adding sodium hydroxide. The obtained solution was placed in a constant-temperature shaker and shaken and adsorbed for 24 h at 25° C. under 190 r/min. Finally, the remaining lithium ion concentration in the solution was measured and a corresponding adsorption capacity of the adsorbent material was calculated.

Figure 4:
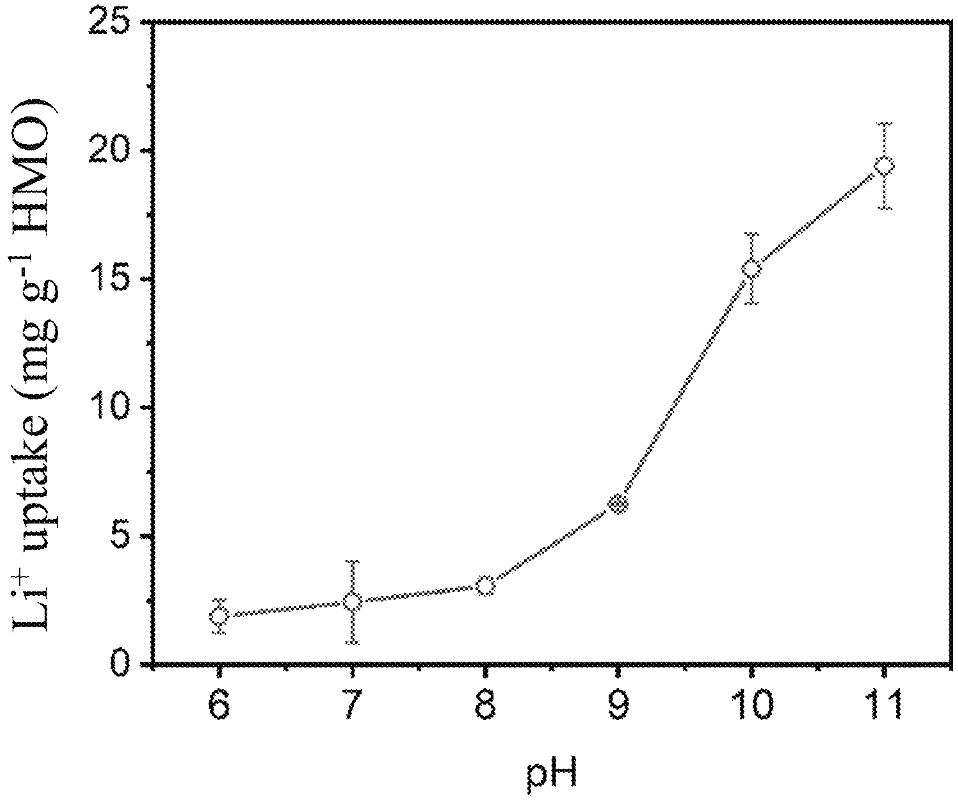
FIG. 4 is a curve illustrating adsorption capacity of the commercial HMO, reflecting the effect of pH of the solution on the adsorption capacity of the commercial HMO.

FIG. 4 is a curve illustrating adsorption capacity of commercial HMO, reflecting the effect of pH of the solution on the adsorption capacity of the commercial HMO. It can be seen that the adsorption capacity of the commercial HMO is significantly affected by the pH of the solution. The commercial adsorbent maintains the good adsorption capacity when the solution is in a strongly alkaline environment. However, when the solution is near neutrality, the adsorption capacity of the commercial adsorbent shows a significant decrease, which is only 15% of the original adsorption capacity.

Embodiment 8

The lithium extraction adsorbents prepared in Embodiments 1-4, the commercial HMO, and the commercial HTO, as the active components, were added into 7% sodium chloride solution (pH=8) with an initial lithium concentration of 25 mg/L, respectively. The dosage of the active components in the above solution was 0.5 g/L. The solution was placed in a constant-temperature shaker and shaken and adsorbed for 24 h at 25° C. under 190 r/min. The remaining lithium ion concentration in the solution was measured and the corresponding adsorption capacity of the adsorbent material was calculated.

Figure 5:
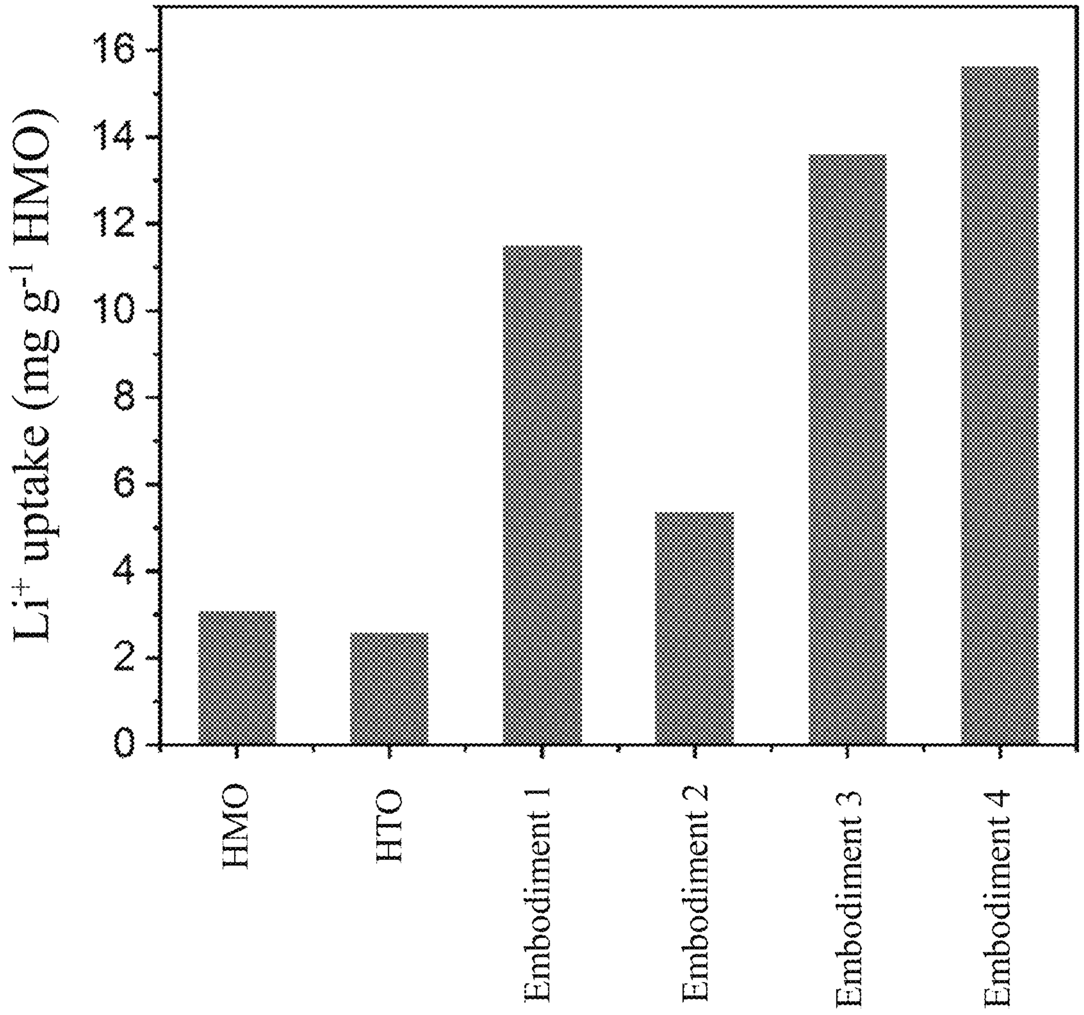
FIG. 5 is a bar chart illustrating the adsorption capacity of commercial HMO, commercial HTO, and the lithium extraction adsorbents prepared according to Embodiments 1 to 4 of the present disclosure, reflecting a comparison of the adsorption capacity of the aforementioned adsorption materials.

FIG. 5 is a bar chart illustrating adsorption capacity of commercial HMO, commercial HTO, and lithium extraction adsorbent prepared according to Embodiments 1~4 of the present disclosure, reflecting a comparison of the adsorption capacity of the aforementioned adsorption materials. It can be seen that the adsorption capacity of the lithium extraction adsorbent (Embodiment 1) with significant function for accelerating hydrogen ion migration coupled with in-situ conversion can reach 11 mg/g in a natural water body, which is three times of the adsorption capacity of HMO under the same condition, and is also twice of the adsorption capacity of the lithium extraction adsorbent (Embodiment 2) with only the function of accelerated hydrogen ion migration under the same condition. The same comparative effect can be achieved using HTO as a control adsorption material. In summary, the lithium extraction adsorbent with microenvironmental regulation function has significantly increased the adsorption capacity under natural condition.

Embodiment 9

A series of the lithium extraction adsorbents with different dopant amount of quaternized chitosan prepared in Embodiment 5, as active components, were added into 7% sodium chloride solution (pH=8) with an initial lithium ion concentration of 25 mg/L. The dosage of the active component in the above solution was 0.5 g/L. The solution was placed in a constant-temperature shaker and shaken and adsorbed for 24 h at 25° C. under 190 r/min. The remaining lithium ion concentration in the solution was measured and the corresponding adsorption capacity of the adsorbent was calculated.

Figure 6:
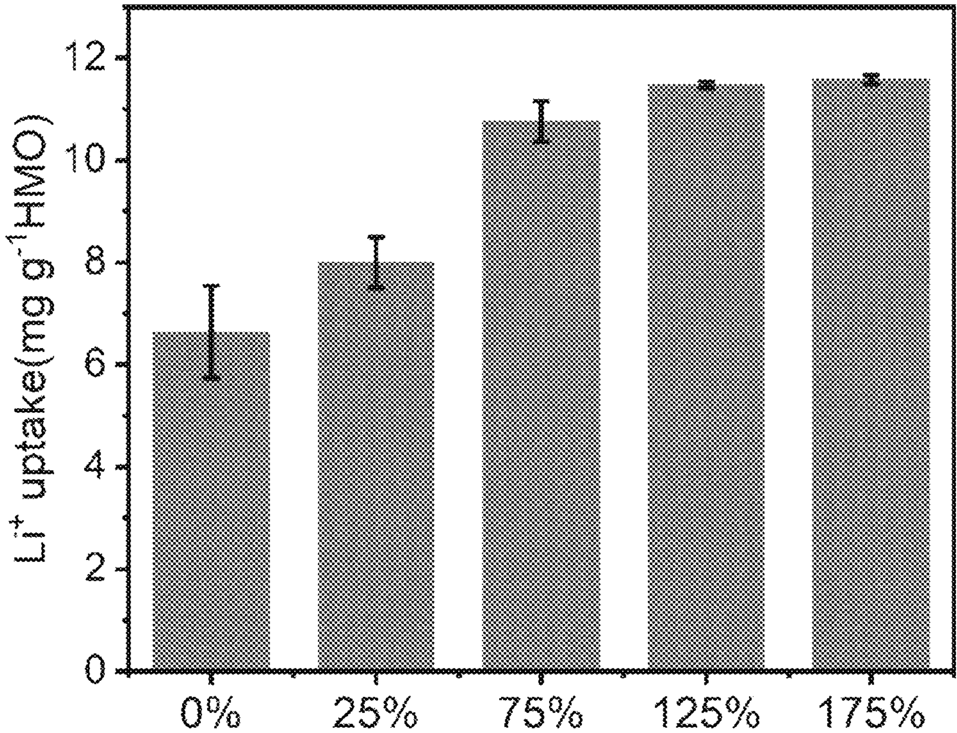
FIG. 6 is a bar chart illustrating the adsorption capacity of the lithium extraction adsorbent prepared according to Embodiment 5 of the present disclosure, reflecting a comparison of the adsorption capacity of a series of the lithium extraction adsorbents with different dopant amounts of quaternized chitosan.

FIG. 6 is a bar chart illustrating adsorption capacity of the lithium extraction adsorbents prepared according to Embodiment 5 of the present disclosure, reflecting a comparison of the adsorption capacity of the series of the lithium extraction adsorbents with different dopant amount of quaternized chitosan. It can be seen that increasing the dopant amount of quaternized chitosan within a certain range benefits enhancement of the adsorption capacity of the lithium extraction adsorbent. When the dopant amount is increased to a certain percentage, the adsorption capacity of the lithium extraction adsorbent is no longer enhanced. Based on various factors, such as the mechanical strength of the adsorbent and the preparation cost, the dopant amount of quaternized chitosan may be set from 0.01% to 175%. In particular, the dopant amount of quaternized chitosan may be set to 50%.

Embodiment 10

A series of the lithium extraction adsorbents with different loading amount of HMO prepared in Embodiment 6, as active components, were added into 7% sodium chloride solution (pH=8) with an initial lithium ion concentration of 25 mg/L. The dosage of the active component in the above solution was 0.5 g/L. The solution was placed in a constant-temperature shaker and shaken and adsorbed for 24 h at 25° C. under 190 r/min. The remaining lithium ion concentration in the solution was measured and the corresponding adsorption capacity of the adsorbent material was calculated.

Figure 7:
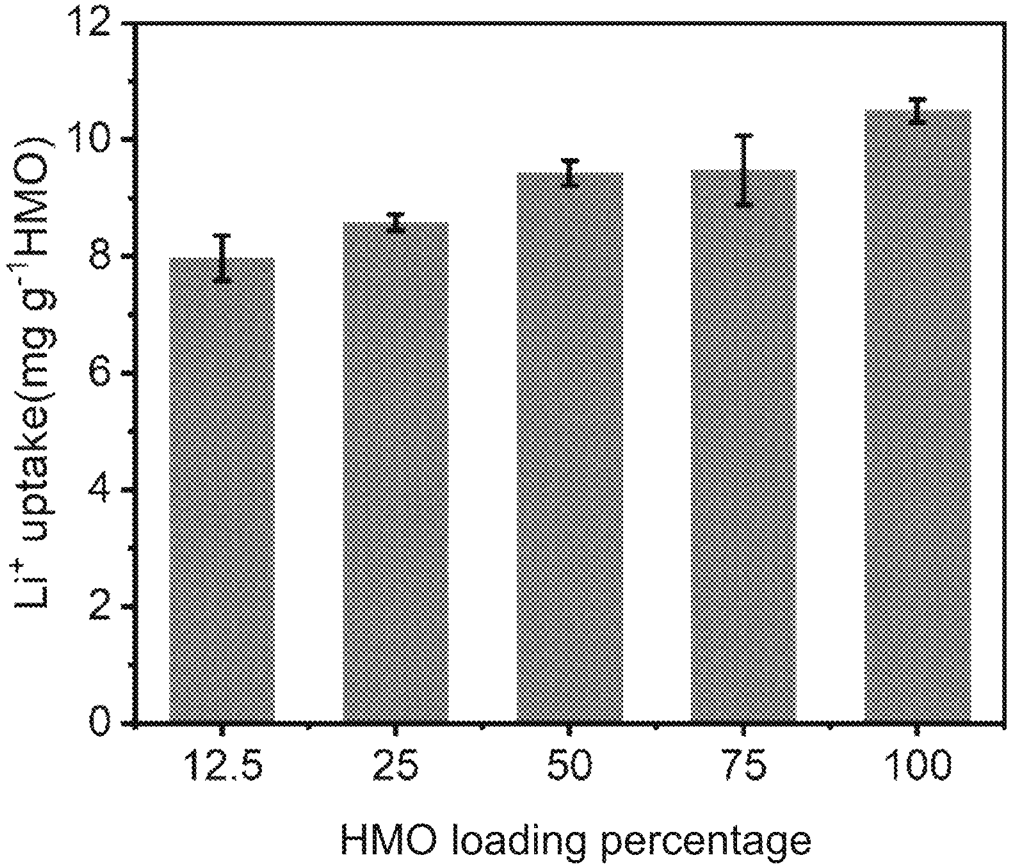
FIG. 7 is a bar chart illustrating the adsorption capacity of the lithium extraction adsorbent prepared according to Embodiment 6 of the present disclosure, reflecting a comparison of the adsorption capacity of a series of the lithium extraction adsorbent with different loading amounts of HMO.

FIG. 7 is a bar chart illustrating adsorption capacity of the lithium extraction adsorbents prepared according to Embodiment 6 of the present disclosure, reflecting a comparison of the adsorption capacity of the series of the lithium extraction adsorbents with different loading amounts of HMO. It can be seen that increasing the loading amount of HMO does not have a significant effect on the adsorption capacity of the adsorbent. Based on various factors, such as the mechanical strength of the adsorbent and the cost of preparation, the loading amount of the HMO may be set from 10% to 100%. In particular, the dopant amount of the HMO may be set to 50%.

Embodiment 11

The HMO and the lithium extraction adsorbent prepared in Embodiment 1, as active components, were added into 7% sodium chloride solution (pH=8) with an initial lithium ion concentration of 25 mg/L. The dosage of the active components in the above solution was 0.5 g/L. The solution was placed in a constant-temperature shaker and shaken and adsorbed at 25° C. under 190 r/min. The remaining lithium ion concentration in the solution was measured at intervals, and a curve of the relationship between the adsorption capacity of the adsorbent and the adsorption time was drawn.

Figure 8:
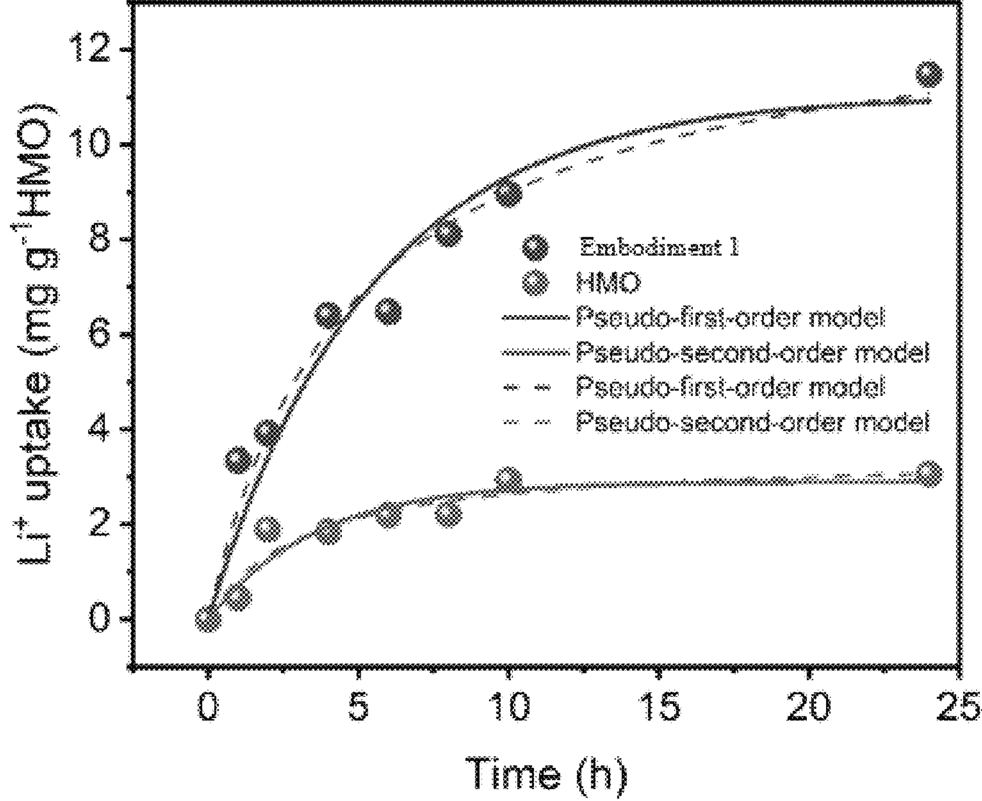
FIG. 8 is a curve illustrating adsorption kinetics of the lithium extraction adsorbent prepared according to Embodiment 1 of the present disclosure.

FIG. 8 is a curve illustrating adsorption kinetics of a lithium extraction adsorbent prepared according to Embodiment 1 of the present disclosure. It can be seen that the adsorption capacity of the adsorbent material gradually increases as the adsorption process progresses. The HMO reaches adsorption saturation earlier, while the adsorption process of the lithium extraction adsorbent of Embodiment 1 may be extended for a longer period of time. This is mainly due to the fact that the lithium extraction adsorbent of Embodiment 1 can effectively remove the effect of accumulation of hydrogen ions through its microenvironmental regulation function, thereby prolonging the duration of the adsorption process.

Embodiment 12

The HMO and the lithium extraction adsorbent prepared in Embodiment 1, as active components, were added into 7% sodium chloride solution (pH-8) with an initial lithium ion concentration ranging from 5 to 55 mg/L. The dosage of the active components in the above solution was 0.5 g/L. The solution was placed in a constant-temperature shaker and shaken and adsorbed for 24 h at 25° C. under 190 r/min. The remaining lithium ion concentration in the solution was measured, and a curve of the relationship between the adsorption capacity of the adsorbent and the initial lithium ion concentration was drawn.

Figure 9:
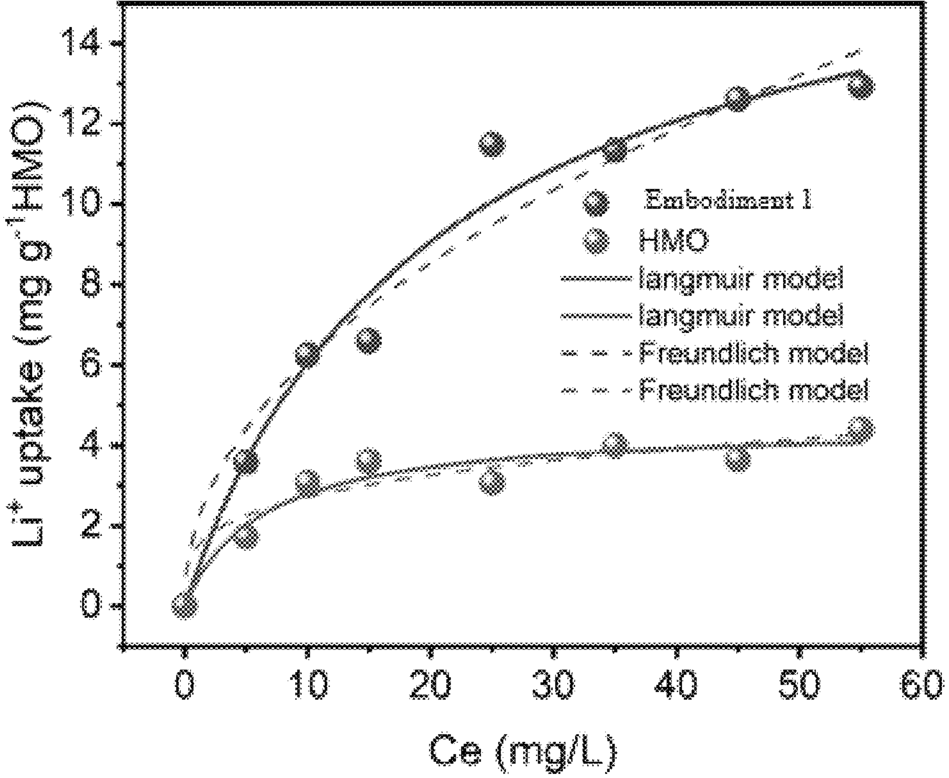
FIG. 9 is an adsorption isotherm curve of the lithium extraction adsorbent prepared according to Embodiment 1 of the present disclosure.

FIG. 9 is an adsorption isotherm curve of a lithium extraction adsorbent prepared according to Embodiment 1 of the present disclosure. It can be seen that as the initial lithium ion concentration in the solution increases, both the HMO and the lithium extraction adsorbent show an increasing trend in the adsorption capacity, followed by a gradual leveling off. The saturated adsorption capacity of the lithium extraction adsorbent prepared in Embodiment 1 is 18 mg/g, and the saturated adsorption capacity of HMO is 4 mg/g. This indicates that the lithium extraction adsorbent prepared in Embodiment 1 can effectively enhance the saturated adsorption capacity of the adsorbent under weakly alkaline condition.

Embodiment 13

The HMO and the lithium extraction adsorbent prepared in Embodiment 1, as active components, were added into a mixed solution (pH=8) containing lithium, sodium, potassium, calcium, and magnesium, respectively. The initial concentrations of lithium, sodium, potassium, calcium, and magnesium in the above mixed solution were all 3.57 mmol/L. The dosage of the active components in the mixed solution was 0.5 g/L. The solution was placed in a constant-temperature shaker and shaken and adsorbed for 24 h at 25° C. under 190 r/min. The remaining concentration of each ion in the mixed solution was measured, and the corresponding adsorption capacity of the adsorbent material was calculated.

Figure 10:
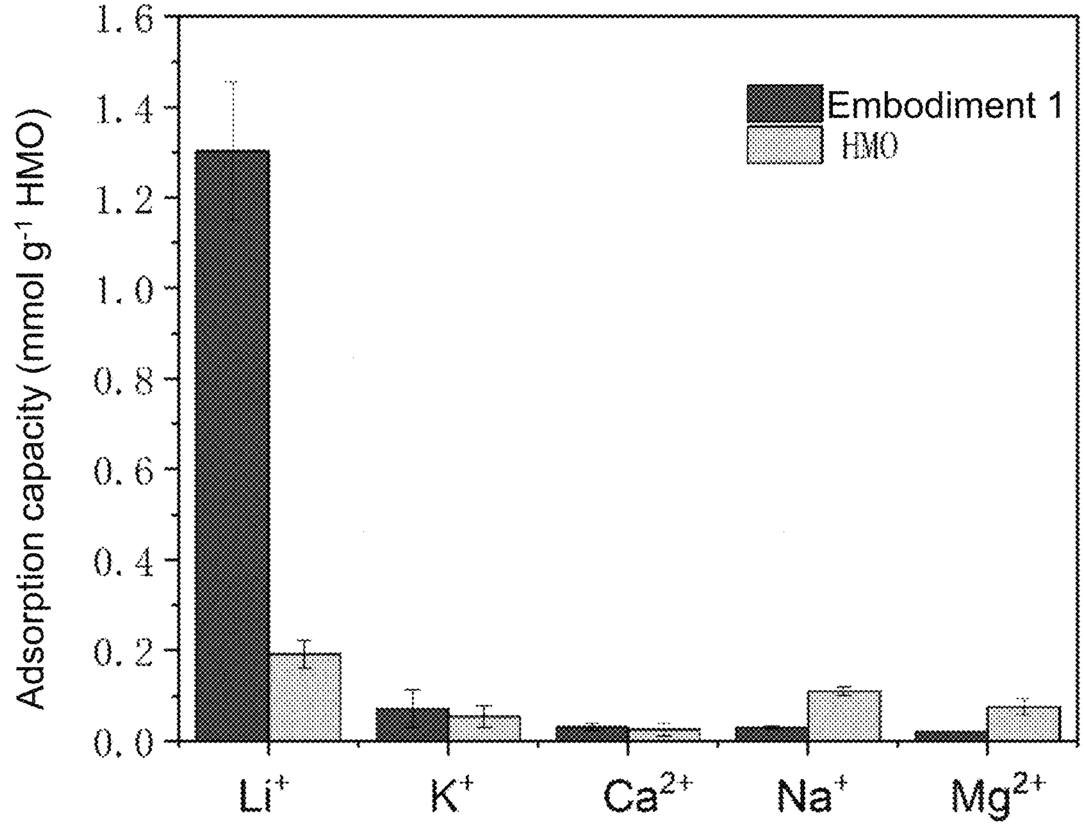
FIG. 10 is a bar chart illustrating the adsorption capacity of the lithium extraction adsorbent prepared according to Embodiment 1 of the present disclosure, reflecting selectivity of the lithium extraction adsorbent under different competing ion condition.

FIG. 10 is a bar chart illustrating adsorption capacity of a lithium extraction adsorbent prepared according to Embodiment 1 of the present disclosure, reflecting the selectivity of the lithium extraction adsorbent under different competing ion condition. It can be seen that the lithium adsorbent of Embodiment 1 has much better selectivity for lithium ion than the HMO under the same condition. This indicates that the lithium adsorbent prepared in Embodiment 1 can effectively improve the adsorption selectivity of the adsorbent under weakly alkaline condition, which is more favorable for application in natural water body.

Embodiment 14

The HMO and the lithium extraction adsorbent prepared in Embodiment 1, as active components, were added into 7% sodium chloride solution (pH=8) with an initial lithium concentration of 25 mg/L. The dosage of the active component in the above solution was 0.5 g/L. The solution was placed in a constant temperature shaker and shaken and adsorbed at 25° C. under 190 r/min. The pH of the solution was measured at intervals, and a curve of the relationship between the pH of the solution and adsorption time was drawn.

Figure 11:
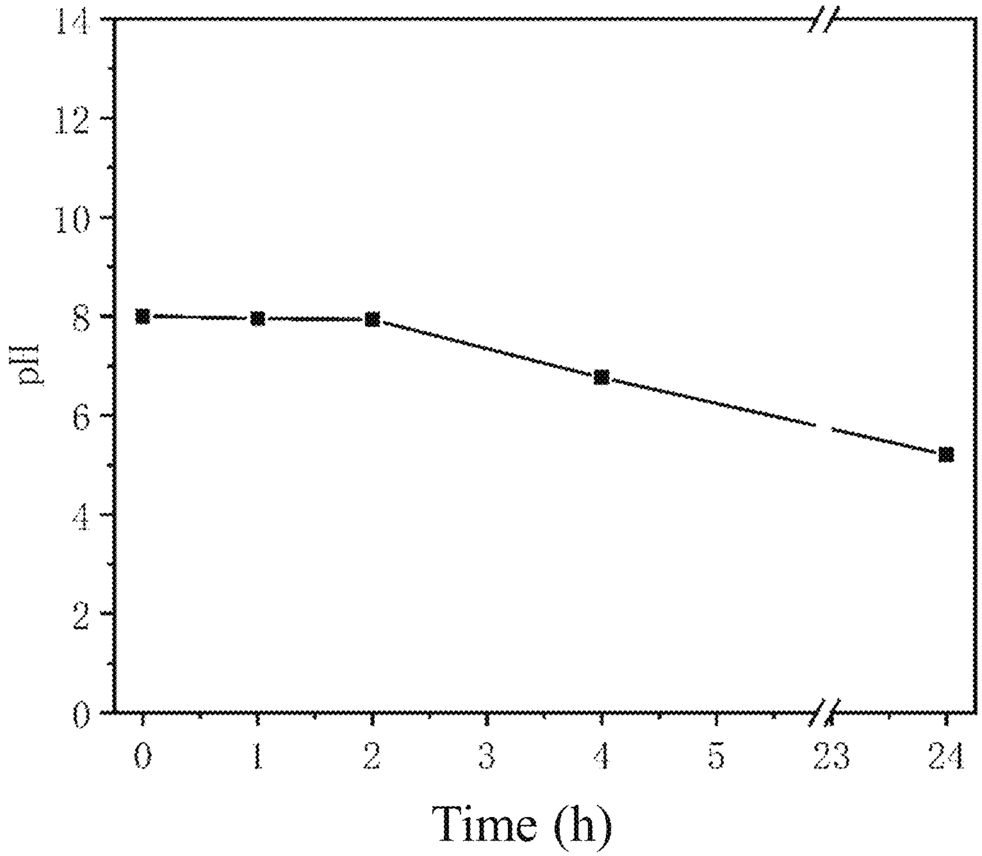
FIG. 11 is a curve illustrating the pH of the solution changing over time during lithium extraction process of the lithium extraction adsorbent prepared according to Embodiment 1 of the present disclosure.

FIG. 11 is a curve illustrating the pH of the solution changing over time during lithium extraction process of a lithium extraction adsorbent prepared according to Embodiment 1 of the present disclosure. It can be seen that the pH of the solution does not increase during the adsorption process over time. This indicates that the lithium extraction adsorbent prepared in embodiment I can promote the increase in the adsorption capacity without raising the pH of the solution, thereby avoiding the problem of excessive precipitation caused by direct addition of alkali.

Embodiment 15

The lithium adsorbent prepared in Embodiment 1, as the active component, was added into 7% sodium chloride solution (with pH of 6, 7, 8, and 9, respectively) with an initial lithium ion concentration of 25 mg/L. The dosage of the active component in the above solution was 0.5 g/L. The solution was placed in a constant-temperature shaker and shaken and adsorbed for 24 h at 25° C. under 190 r/min. The remaining lithium ion concentration in the solution was measured, and the corresponding adsorption capacity of the adsorbent material was calculated.

Figure 12:
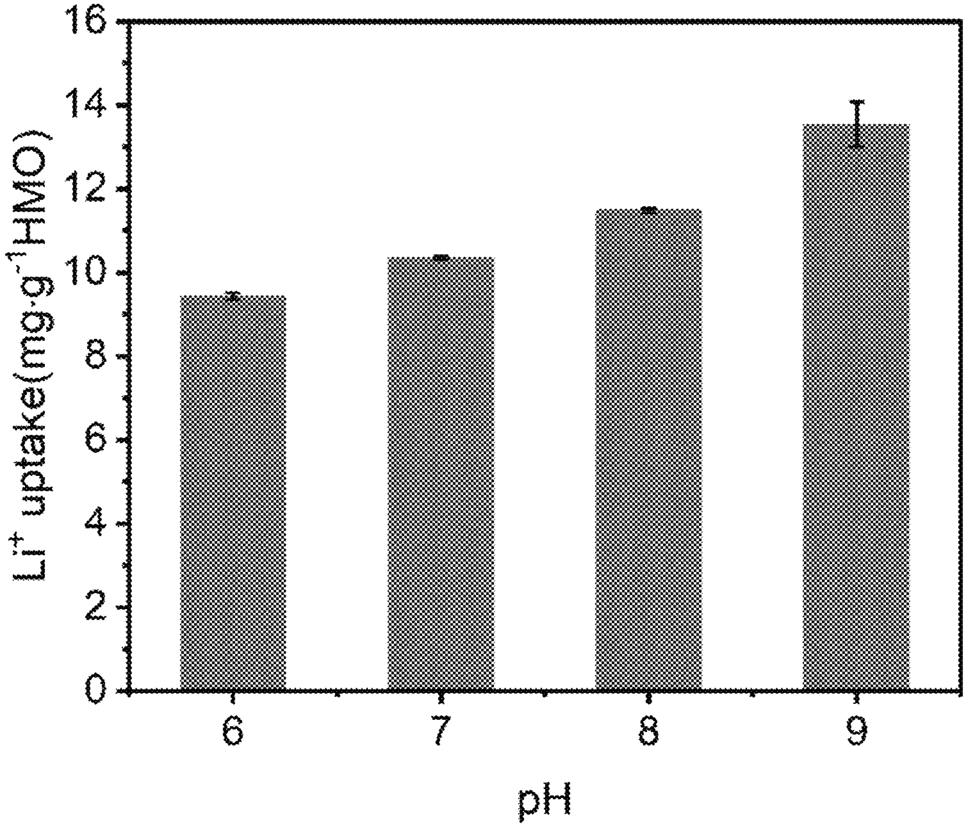
FIG. 12 is a bar chart illustrating the adsorption capacity of the lithium extraction adsorbent prepared according to Embodiment 1 of the present disclosure, reflecting the effect of pH of the solution on the adsorption capacity of the lithium extraction adsorbent.

FIG. 12 is a bar chart illustrating adsorption capacity of a lithium extraction adsorbent prepared according to Embodiment 1 of the present disclosure, reflecting the effect of pH of the solution on the adsorption capacity of the lithium extraction adsorbent. It can be seen that the adsorbent with microenvironmental regulation exhibits excellent adsorption capacity under different pH condition, indicating its suitability for complex natural water body and the adsorption capacity is minimally affected by the environment.

The method for preparing the lithium extraction adsorbent and its application in the present disclosure provide several beneficial effects, including but not limited to: (1) simplicity in the preparation process, readily available and inexpensive raw materials that are biodegradable, environmentally friendly, and promising in application; (2) the lithium extraction adsorbent with microenvironmentally regulation function being capable of achieving the high adsorption capacity and ion selectivity in weakly alkaline environment by accelerating hydrogen ion migration coupled with in-situ conversion to overcome the inhibitory effect of hydrogen ion enrichment within the adsorbent without increasing the pH of the entire water body; (3) in the practical water body application, due to the presence of a large amount of impurity ions, a large amount of reagents being required and excess precipitation being generated by directly addition of alkali to adjust the pH of the solution, however, according to the present invention, the amount of the used reagent being significantly reduced, precipitation being not generated during use, and the output of alkaline wastewater being effectively reduce. It should be noted that different embodiments may provide different beneficial effects. The disclosed embodiments may provide any combination of the aforementioned beneficial effects or any other beneficial effects that may be obtained.

Those skilled in the art should understand that the above embodiments are merely illustrative of, and do not constitute a limitation on the present invention. Any modifications, equivalent substitutions, changes, etc., made within the spirit and principles of the present invention shall be included in the scope of protection of the present invention.

Also, the present disclosure uses specific words to describe embodiments of the present disclosure. For example, “an embodiment,” “the embodiment,” and/or “some embodiments” are meant to refer to a particular feature, structure, or characteristic associated with at least one embodiment of the present disclosure. Accordingly, it should be emphasized and noted that “an embodiment” or “the embodiment” or “an alternative embodiment” referred to two or more times in different places in the present disclosure does not necessarily mean the same embodiment. In addition, certain features, structures, or characteristics in one or more embodiments of the present disclosure may be suitably combined.

Numbers describing the number of components, attributes, and properties are used in some embodiments, and it should be appreciated that such numbers used in the description of embodiments are modified by the modifiers “about”, “approximately”, or “generally” in some examples. Unless otherwise noted, “about”, “approximately”, or “generally” indicates that the described numbers allow for ±20% variation. Correspondingly, in some embodiments, the numerical parameters used in the present disclosure and the claims are approximations, which can change depending on the desired characteristics of the individual embodiment. In some embodiments, the numerical parameters should take into account the specified number of valid digits and use a general digit retention method. While the numerical domains and parameters used to confirm the breadth of their ranges in some embodiments of the present disclosure are approximations, in specific embodiments such values are set to be as precise as possible within a feasible range.

For each patent, patent application, patent application disclosure, and other material cited in the present disclosure, such as articles, books, specification sheets, publications, documents, and the like, the entire contents of which are hereby incorporated herein by reference. Except for application history documents that are inconsistent with or create a conflict with the contents of the present disclosure, and except for documents that limit the broadest scope of the claims of the present disclosure (currently or hereafter appended to the present disclosure). It should be noted that to the extent that the descriptions, definitions, and/or use of terms in the materials appended to the present disclosure are inconsistent with or in conflict with the contents of the present disclosure, the descriptions, definitions, and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be viewed as consistent with the teachings of the present disclosure as an example, not as a limitation. As such, alternative configurations of embodiments of the present disclosure may be viewed as consistent with the teachings of the present disclosure, as an example, not as a limitation.

What is claimed is:

1. A method for preparing a lithium extraction adsorbent, the method comprising:

(i) forming a homogeneous casting liquid by stirring a metal-based lithium ion sieve, a chitosan, and a quaternized chitosan;

(ii) adding the homogeneous casting liquid dropwise to a solidifying liquid to obtain gel particles, wherein the solidifying liquid consists of sodium hydroxide and ethanol; and (iii) washing the gel particles to neutrality with deionized water to obtain washed gel particles, followed by placing the washed gel particles in a glutaraldehyde solution for stirring to crosslink for 0.5 h to 12 h to obtain crosslinked gel particles, freeze-drying the crosslinked gel particles to obtain the lithium extraction adsorbent, activating the lithium extraction adsorbent by placing the lithium extraction adsorbent into an alkali activator for stirring for 0.5 h to 12 h, and washing the lithium extraction adsorbent to neutrality with deionized water to obtain an activated lithium extraction adsorbent, wherein the alkali activator includes one or more of sodium hydroxide, barium hydroxide, potassium hydroxide, and ammonia, a concentration of the alkali activator is in a range of 0.001 M to 1 M, and a time of activating is 0.5 h to 12 h.

2. The method according to claim 1, wherein the metal-based lithium ion sieve is manganese-based lithium ion sieve (HMO).

3. The method according to claim 1, wherein a mass ratio of the metal-based lithium ion sieve, quaternized chitosan, and the chitosan is 1.125:1.25:1.

4. The method according to claim 1, wherein the metal-based lithium ion sieve is prepared by a process including:

(a) weighing a lithium salt and a metal precursor in a molar ratio of lithium to manganese of 1:2 to 2:1 and mixing the lithium salt and the metal precursor in a ball mill for 2 h to obtain a mixed powder;

(b) placing the mixed powder into a tube furnace and calcining the mixed powder at 300° C. to 500° C. for 4 h to 8 h under air atmosphere to obtain a lithium ion sieve precursor; and (c) placing the lithium ion sieve precursor into a hydrochloric acid solution with 0.5 M for pickling for 12 h to 24 h at room temperature to obtain a pickled lithium ion sieve precursor, and drying the pickled lithium ion sieve precursor at 35° C. to 100° C. for 8 h to 24 h to obtain the metal-based lithium ion sieve.

5. The method according to claim 4, wherein the lithium salt includes one or more of lithium chloride, lithium carbonate, lithium hydroxide and hydrates thereof.

6. The method according to claim 4, wherein the metal precursor includes one of manganese carbonate, manganese acetate, and manganese nitrate.

7. The method according to claim 1, wherein a concentration of the glutaraldehyde solution is in a range of 0.01 M to 0.2 M, and a time of crosslinking is 3.5 h.

8. The method according to claim 7, wherein the concentration of the glutaraldehyde solution is 0.1 M, and the time of the crosslinking is 3.5 h.

9. The method according to claim 1, wherein the metal-based lithium ion sieve is a titanium-based lithium ion sieve (HTO), and the metal-based lithium ion sieve is prepared by:

weighing a lithium salt and a metal precursor in a molar ratio of lithium to titanium of 1:2 to 2:1 and mixing the lithium salt and the metal precursor in a ball mill for 2 h to obtain a mixed powder;

placing the mixed powder into a tube furnace and calcining the mixed powder at 500° C. to 700° C. for 4 h to 8 h under air atmosphere to obtain a lithium ion sieve precursor; and placing the lithium ion sieve precursor into a hydrochloric acid solution with 0.5 M for pickling for 12 h to 24 h at room temperature to obtain a pickled lithium ion sieve precursor, and drying the pickled lithium ion sieve precursor at 35° C. to 100° C. for 8 h to 24 h to obtain the metal-based lithium ion sieve.

10. The method according to claim 1, wherein the concentration of the alkali activator is in a range of 0.001 M to 0.5 M.

11. The method according to claim 10, wherein the concentration of the alkali activator is 0.001 M.

12. The method according to claim 11, wherein the time of the activating is 0.5 h to 6 h.

13. The method according to claim 12, wherein the time of the activating is 1 h.

* * * * *